United States Patent [19]

Robinson et al.

[11] Patent Number: 5,026,409
[45] Date of Patent: Jun. 25, 1991

[54] PREPARATION OF FLUORIDE GLASS OPTICAL PREFORMS AND FIBERS

[75] Inventors: M. Robinson, Agoura; Antonio C. Pastor, Santa Monica; Ricardo C. Pastor, Manhattan Beach, all of Calif.

[73] Assignee: Hughes Aircraft Company, Los Angeles, Calif.

[21] Appl. No.: 292,792

[22] Filed: Jan. 3, 1989

[51] Int. Cl.$^5$ ............................................. C03B 37/14
[52] U.S. Cl. ..................................... 65/3.11; 65/3.12; 65/900; 65/DIG. 16
[58] Field of Search ............ 65/2, 3.11, 900, DIG. 16, 65/3.12

[56] References Cited

U.S. PATENT DOCUMENTS

| | | | |
|---|---|---|---|
| 4,519,826 | 5/1985 | Troy | 65/3.11 |
| 4,659,352 | 4/1987 | Robinson | 65/DIG. 16 |
| 4,668,263 | 5/1987 | Tokota et al. | 65/DIG. 16 |
| 4,749,396 | 6/1988 | Hicks | 65/3.12 |
| 4,793,842 | 12/1988 | Tokota et al. | 65/DIG. 16 |
| 4,820,322 | 4/1989 | Baumgert et al. | 65/3.11 |

Primary Examiner—Peter Kratz
Attorney, Agent, or Firm—Paul M. Coble; W. K. Denson-Low

[57] ABSTRACT

A preform for preparation of optical fibers is prepared by inserting a rod of a higher index of refraction fluoride glass into the bore of a hollow cylinder of a lower index of refraction fluoride glass fiber. This preform precursor is processed to collapse the hollow cylinder inwardly to form a composite preform having a high-refractive index core and a low-refractive index casing. The preparing of the glasses and processing to a preform are accomplished in a reactive environment that reacts and removes oxygen and hydrogen containing species from the glass, the reactive environment being, for example, $Cl_2$, $CCl_4$, $SF_6$, $BF_3$, $CF_4$, or the decomposition products of a liquefied solid fluorocarbon. The preform is then drawn to an optical fiber.

15 Claims, 1 Drawing Sheet

PREPARATION OF FLUORIDE GLASS OPTICAL PREFORMS AND FIBERS

BACKGROUND OF THE INVENTION

This invention relates to optical glass fibers, and, more particularly, to the preparation of optical glass preforms of fluoride glass and to optical fibers drawn therefrom.

Optical fibers are strands of glass fiber processed so that light beams transmitted therethrough are subjected to total internal reflection. A large fraction of the incident intensity of light directed into the fiber is received at the other end of the fiber, even though the fiber may be hundreds of meters long. Optical fibers have shown great promise in communcations and other applications, because a high density of information may be carried along the fiber and because the quality of the signal is less subject to external interferences of various types than are electrical signals carried on metallic wires. Moreover, the glass fibers are light in weight.

Optical glass fibers are typically fabricated by preparing a preform of glasses of two different optical indices of refraction, the glass of higher index inside the other, and then processing the preform to a fiber by drawing or extruding. The optical fiber is coated with a polymer layer termed a buffer coating to protect the glass fiber from damage during later use. The resulting optical fiber has a core of the glass of higher index of refraction, a casing of the glass of lower index of refraction, and the overlying buffer coating. Light is transmitted through the core over great distances with little loss of energy, because the light is subject to total internal reflection at the core/casing interface due to the differences in the indices of refraction.

The optical fiber is made from two glass materials, in the manner indicated, that are selected to have the required optical properties for particular applications. As commonly used, the term "glass" refers to materials that are transparent to radiation such as visible light, so that they permit radiation energy to pass or conduct the radiation, but prevent passage of matter. The radiation may be visible light, but can also include those forms of radiation that are not visible to the human eye. For example, infrared energy, having a wavelength greater than that of visible light, is not visible to the human eye. Infrared light includes electromagnetic radiation having wavelengths of from about 0.8 to about 8 micrometers, and sometimes beyond. Infrared light is used in a variety of devices, including fiber optic communications systems, detectors, photocells, vidicons, and the like.

Optical fibers for visible light are made of silicon dioxide based glasses. These glasses are readily prepared and are highly transmissive to visible light having wavelengths of from about 0.3 to about 0.7 micrometers, and to certain other forms of electromagnetic radiation. However, the silicon dioxide glasses have much poorer transmission of infrared energy, and generally cannot be used as optical fibers for transmission of infrared energy having a wavelength greater than about 1.8 micrometers, except over very short distances.

Glass compositions based upon metal upon metal fluorides are known to have good transmission to infrared radiation, and have been successfully tested for use in infrared fiber optical systems. However, the techniques used to fabricate optical fiber preforms of silicon dioxide glasses cannot be readily used to fabricate corresponding preforms of metal fluoride glasses, and other approaches must be developed.

A preferred method for fabricating preforms of silicon dioxide glasses is by chemical vapor deposition, wherein two or more gases that react to form the core glass are passed through the hollow glass casing, depositing a soot on the interior of the casing. The soot is converted to a glass residing upon the inner diameter of the casing, and the casing is then collapsed to form a solid preform which is drawn to an optical fiber. There is no good gaseous source for fluoride glasses, and this technique has not been extended to fabrication of fluoride glass optical preforms.

Instead, fluoride glass optical fibers are prepared by casting a central core into a previously cast casing cylinder, either in a stationary or spinning mold approach. In these techniques, a hollow glass cylinder of the casing glass is first cast. For stationary casting, only the periphery of the cylinder is hardened and the central liquid glass is allowed to drain from the mold. The core glass is then cast into the central cavity. This approach usually results in an undesirably tapered central core and a diffuse interface between the core and the casing due to melt back of the casing when the core glass is poured. The diffuse interface impairs the optical transmission of the finished optical fiber.

In the spinning mold technique, a mold is spun about its cylindrical axis and then liquid glass of the casing composition is poured into the interior. The casing glass is distributed evenly around the interior of the bore, and rapidly cooled until it solidifies as a uniform layer. The core glass is poured into the solid glass casing and permitted to solidify. This approach reduces the tapering of the core, but there is still a diffuse interface due to melt back, causing a reduction of efficiency in the internal reflection of the final optical fiber. The rate of success for this technique is only about 20 percent, with only one out of every five preforms being acceptable for use in subsequent drawing of an optical fiber.

Thus, there is a need for a technique for improved fabrication of preforms of fluoride glasses to be used in the preparation of optical fibers. Such an approach should produce uniform preforms that have high transmission of light and a sharp core/casing interface, with a high percentage of acceptable preforms. The present invention fulfills this need, and further provides related advantages.

SUMMARY OF THE INVENTION

The present invention provides a process for preparation of a high quality fluoride glass preform and optical fiber produced from the preform. The process is flexible, permitting a wide range of ratios of the core diameter to the casing diameter, and permitting the use of many different types of fluoride glasses. The preform is of high quality, with a sharp core/casing interface. The process is particularly adapted to permit reduction of impurities that impair the performance of fluoride glasses.

In accordance with the invention, a process for producing an optical fiber preform comprises the steps of fabricating a hollow cylinder of a first fluoride glass in a reactive environment that reacts and removes oxygen and hydrogen containing species from the glass, the hollow cylinder having an inner bore; fabricating an inner cylinder of a second fluoride glass in a reactive environment that reacts and removes oxygen and hydrogen containing species from the glass, the second fluoride glass having a refractive index greater than that of the first fluoride glass and having a cylindrical diameter less than that of the inner bore of the hollow cylinder; inserting the inner cylinder into the inner bore of the hollow cylinder, the inner cylinder and hollow cylinder together being a preform precursor; and processing the preform precursor to bond together the inner cylinder and the hollow cylinder. An optical fiber is then drawn or extruded from the preform.

The fluoride glasses are prepared in a reactive environment that removes oxygen and hydrogen containing impurities, which can impair the optical transmission of the glass if they remain in the drawn optical fiber. The preferred reactive environment is a gas, such as $Cl_2$, $CCl_4$, $SF_6$, $BF_3$, $CF_4$, or the decomposition products of a molten or liquefied solid fluorocarbon. Desirably, the processing of the preform precursor is also accomplished in such an environment.

The present invention provides an important advance in the art of preparing preforms and optical fibers from fluoride glasses. The preforms may be reproducibly fabricated with high quality. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
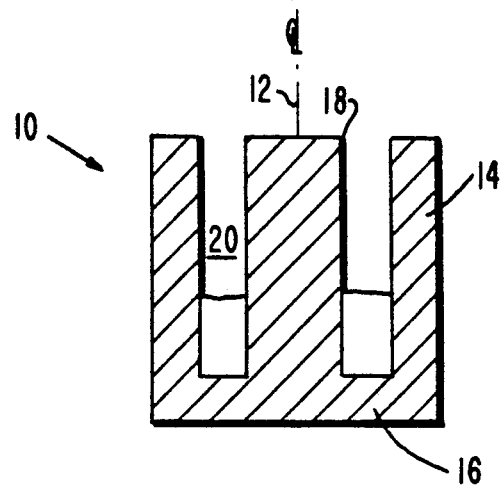
FIG. 1 is a side sectional view of a crucible mold for preparing the hollow cylindrical housing, with glass partially filling the mold cavity

Briefly, in the practice of the present invention according to a preferred embodiment, the outer hollow cylinder and the inner cylinder are prepared and furnished as solid components, fitted together, and processed to a solid composite rod. Both pieces are preferably solidifed to shape, the outer hollow cylinder in a cylindrical mold with a center form and the inner cylinder in a conventional cylindrical mold. The surface of the inner cylinder, which is typically a solid rod, is machined or ground to a clean surface, and then inserted into the bore of the hollow cylinder. The hollow cylinder is collapsed onto the inner cylinder, forming a single integral preform suitable for fiber drawing. The collapse of the outer cylinder is preferably accomplished by heating the preform to its softening temperature and applying a force to its external surface with a hydrostatic fluid pressure.

The fluoride glasses are preferably prepared in a reactive atmosphere, and the preform is processed in a reactive atmosphere. The reactive environment contains a reactant that reacts with elements or compounds that might be present in the glass or at the interface between the hollow cylinder and the inner cylinder, whose presence could later impair the optical performance of the glass fiber. The present fabrication method is particularly suited to the use of such reactants, unlike more complex techniques such as melt spinning.

The present process is designed to ensure the high quality of the resulting optical preform and fiber. It utilizes solid pieces that are prepared and inspected before assembly and processing, so that unacceptable pieces may be discarded. The interface between the outer surface of the inner cylinder and the wall of the bore of the hollow cylinder, which becomes the critical internally reflective surface of the completed optical fiber, undergoes no melt back during processing, so that there is a sharp dividing line between the two glasses in the final product. This sharp interface reduces loss of light from the optical fiber. The process itself is well controlled.

The fluoride glasses are selected from the wide range of operable compositions possible for fluoride glasses. Such fluoride glasses typically include a major component of $ZrF_4$ or $HfF_4$, with minor components selected from other fluorides such as $BaF_2$, $LaF_3$, $AlF_3$, $LiF$, $NaF$, and $PbF_2$. The preparation of such glasses is not within the scope of the present invention, but is known in the art and is described, for example, in Treatise of Materials Science and Technology, Vol. 26, edited by M. Tomozawa and R. H. Doremus, and in particular in Chapter 3, "Heavy Metal Fluoride Glasses", by Martin G. Drexhage, and in U.S. Pat. No. 4,659,352, whose disclosures as incorporated by reference. Some operable compositions of glass include those of the following table, where the compositions are in mole percent. The refractive index of each solid glass composition is shown at the foot of each column.

TABLE 1

| Constituent | Glass No. | | |
|---|---|---|---|
| | I | II | III |
| $ZrF_4$ | 53. | 51.3 | 51. |
| $BaF_2$ | 19. | 17. | 16. |
| $LaF_3$ | 5. | 5. | 5. |
| $AlF_3$ | 3. | 3. | 3. |
| $LiF$ | 20. | 20. | 20. |
| $PbF_2$ | 0. | 3.7 | 5. |
| Refractive Index | 1.512 | 1.517 | 1.525. |

These compositions are derived from those listed in the publication "Fluoride Glass Preforms Prepared by a Rotational Casting Process" by D. C. Tran et al., Electronics Letters, Issue 15, Jul. 1982.

In selecting fluoride glasses for use in the present invention, the primary limitation is that the refractive index of the core glass be larger than that of the cladding glass. Thus, in the glasses of Table I, Composition I could be used as the casing with either Composition II or III as the core. Composition II could be used as the casing, with Composition III as the core. In making glasses, $HfF_4$ is sometimes substituted in part of the $ZrF_4$ to lower the refractive index, thus making a glass suitable for use in the cladding.

The use of the invention is not restricted to these particular compositions, but extends to all fluoride glass compositional pairs wherein the fluoride glass selected for the casing has a refractive index less than that of the fluoride glass selected for the core.

The casing is prepared by melting pieces of the lower index of refraction fluoride glass in a vitreous carbon container such as the crucible mold 10 of FIG. 1. The crucible mold 10 is cylindrically symmetric about an axis 12. The crucible mold 10 includes an outer cylindrical wall 14 on a base 16. It further includes a central cylindrical mold form 18 supported from the base 16, that is concentric with the cylindrical wall 14 and spaced apart therefrom to form a mold cavity 20. The glass is melted in the mold cavity 20 and rapidly solidified to form a hollow cylinder casing 22 having a bore 24 therethrough, as shown in FIG. 2.

A solid core 26 is prepared by melting pieces of the appropriate high index of refraction fluoride glass in a vitreous carbon, simple cylindrical crucible mold, rapidly solidifying the glass as a cylindrical rod, and cleaning the outer surface of the rod to form the core. If any surface defects are present, the solid glass rod may be cleaned by machining or grinding a small amount of glass from the surface of the rod to produce a clean, uniform surface.

Both the core 26 and the casing 22 are melted and solidified under a reactive atmosphere, preferably containing $SF_6$. A most preferred atmosphere is a mix of about 20 mole percent $SF_6$ in argon gas. The reactive atmosphere reacts and removes oxygen and hydrogen containing species, which if left in the glass, are instrumental in forming scattering centers that reduce the light transmission of the optical glass fiber. The reactive atmosphere desirably is slightly oxidizing to prevent the formation of a zirconium ion of reduced valence, which also causes discoloration and reduced transmission of the fluoride glass. With these impurities removed, it is expected that impurity cation fluorides will be volatile and vaporized during the melting operation.

Figure 2:
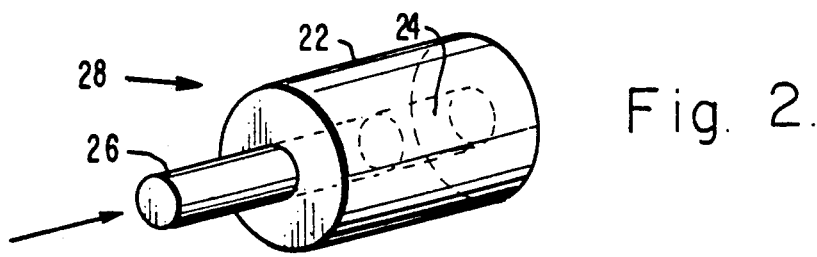
FIG. 2 is a perspective drawing of a preform being assembled.

The core 26 is inserted into the bore 24 of the casing 22, as illustrated in FIG. 2, to form a preform precursor 28. For this purpose, the cylindrical diameter of the bore 24 is made slightly larger than the cylindrical outer diameter of the core 26. In a typical illustrative example, the core 26 is a rod about 10 millimeters in diameter and 200 millimeters long. The casing 22 has a bore cylindrical diameter of about 10.5 millimeters, an outer cylindrical diameter of about 15 millimeters, and a length of about 200 millimeters. These dimensions are by way of example only, and not limiting of the invention.

Figure 3:
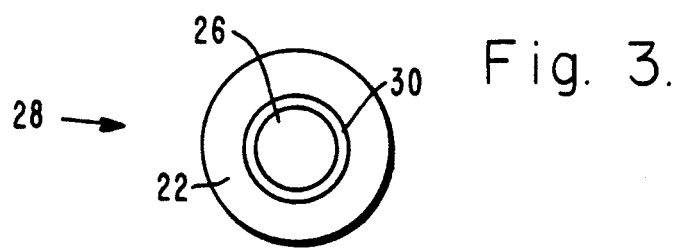
FIG. 3 is an end elevational view of a preform assembly.

FIG. 3 illustrates the end view of the preform precursor 28. There is a small gap 30 between the outer diameter of the core 26 and the inner diameter of the casing 22, which has been exaggerated in the drawing for the purpose of illustration. The gap is typically a few thousandths of an inch wide.

The casing 22 is laterally collapsed to contact the core 26, thereby removing the gap 30. In a preferred approach, the collapse is accomplished using an external hydrostatic liquid pressure. In accordance with the invention, a process for producing an optical fiber preform comprises the steps of placing a casing of a first fluoride glass over a core of a second fluoride glass to form a preform precursor, the first fluoride glass having a refractive index less than that of the second fluoride glass; and compressing the casing to collapse it onto the core, the step of compressing being conducted in a reactive environment containing reactants selected from the group consisting of $Cl_2$, $CCl_4$, $SF_6$, $BF_3$, $CF_4$, and the decomposition products of a liquefied solid fluorocarbon. A particularly preferred solid fluorocarbon is polymerized $C_2H_4$, or virgin polytetrafluoroethylene, that has no binders or other additions.

The ability to prepare the preform in the reactive environment is highly significant for the fabrication of fluoride glass optical preforms. Silicon dioxide based glasses may be readily processed in air, but the moisture in the air significantly degrades the properties of fluoride glasses. The reactive environment reacts and removes the oxygen and hydrogen containing hydroxide ions that cause the degradation, and can also react and remove other undesirable ions that may be present. Prior approaches to the fabrication of fluoride glass preforms simply do not permit the use of reactive gas processing without extensive equipment modifications.

In the preferred approach, the preform precursor is placed into a pressurized molten fluorocarbon liquid at a temperature above the softening temperature of the glass in the casing. For the glasses indicated previously, a temperature of about 300 C. and a pressure of about 2000 pounds per square inch (psi) is sufficient. The hydrostatic pressure causes the cylindrical diameter of the casing to be reduced as the glass collapses inwardly to close the gap between the core and the casing.

The preferred fluorocarbon is virgin molten polytetrafluoroethylene (known commercially as teflon), which produces fluorocarbons such as $C_2F_4$ during decomposition, aiding in the reaction and elimination of oxygen and hydrogen containing impurities, as previously discussed. More generally, other liquefied solid fluorocarbons and even inorganic liquids such as lead may be used to provide the hydrostatic pressure. The uses of the fluorocarbon is preferred, however, as it reacts any remaining oxygen and hydrogen containing species even during the processing of the preform precursor.

The collapse of the casing proceeds until the inner wall of the bore 24 of the casing 22 contacts the outer wall of the core 26 and the two fuse together to form the optical fiber precursor. Under the condition discussed, this processing requires several minutes, as the gap is small. The contact between the inner wall of the bore 24 and the outer wall of the core 26 is the key cylindrical interface, which is sharp and undiffused, and of low impurity content. This interface forms the internally reflecting surface of the final optical fiber product, and is of particularly high quality when prepared by the process of the invention as compared with prior processes wherein the interfacial region was melted during fabrication.

The optical fiber precursor is then drawn by fiber drawing to a reduced diameter to form the optical fiber. In accordance with this aspect of the invention, a process for producing an optical fiber comprises the steps of fabricating a hollow cylinder of a first fluoride glass in a reactive environment that reacts and removes oxygen and hydrogen containing species from the glass, the hollow cylinder having an inner bore; fabricating an inner cylinder of a second fluoride glass in a reactive environment that reacts and removes oxygen and hydrogen containing species from the glass, the second fluoride glass having a refractive index greater than that of the first fluoride glass and having a cylindrical diameter less than that of the inner bore of the hollow cylinder; inserting the inner cylinder into the inner bore of the hollow cylinder, the inner cylinder and hollow cylinder together being a preform precursor; processing the preform precursor to bond together the inner cylinder and the hollow cylinder; and drawing the processed preform precursor into a glass fiber. The fiber is drawn without a die, as is well known in the art. By way of example, the diameter of the finished optical fiber is typically 250 micrometers, or about 0.010 inch.

In another approach, the processing of the preform precursor to collapse the casing and the drawing of the fiber from the precursor can be combined into a single drawing operation. A preform precursor, having the core 26 in the casing 22, is placed into a drawing apparatus. The initial draw reduces the outer diameter of the casing 22 so that the gap between the casing and the core is eliminated, thereby forming the preform. Further drawing from that point produces the optical fiber.

The present invention thus provides a method for fabricating a fluoride glass preform and optical fiber drawn therefrom. Although a particular embodiment of the invention has been described in detail for purposes of illustration, various modifications may be made without departing from the spirit and scope of the invention. Accordingly the invention is not to be limited except as by the appended claims.

What is claimed is:

1. A process for producing an optical fiber preform, comprising the steps of:

fabricating a hollow cylinder of a first fluoride glass in a reactive environment that reacts and removes oxygen and hydrogen containing species from the glass, the hollow cylinder having an inner bore;

fabricating an inner cylinder of a second fluoride glass in a reactive environment that reacts and removes oxygen and hydrogen containing species from the glass, the second fluoride glass having a refractive index greater than that of the first fluoride glass and having a cylindrical diameter less than that of the inner bore of the hollow cylinder;

inserting the inner cylinder into the inner bore of the hollow cylinder, the inner cylinder and hollow cylinder together being a preform precursor; and processing the preform precursor to bond together the inner cylinder and the hollow cylinder including hot pressing the preform precursor by applying a hydrostatic force to the exterior surface of the hollow cylinder.

2. The process of claim 1, wherein the step of processing is conducted in a reactive environment that reacts and removes oxygen and hydrogen containing species from the preform precursor.

3. The process of claim 1, wherein the step of fabricating a hollow cylinder includes the step of:

solidifying the first fluoride glass in a crucible mold having a cylindrical outer wall and a coaxial cylindrical inner mold form, so that the glass forms the hollow cylinder upon cooling.

4. The process of claim 3, wherein the crucible mold is composed of vitreous carbon.

5. The process of claim 1, wherein the step of fabricating an inner cylinder includes the steps of:

solidifying the second fluoride glass in a cylindrical crucible mold, and removing the outer surface layer of the hardened glass cylinder.

6. The process of claim 5, wherein the crucible mold is formed of vitreous carbon.

7. The process of claim 1, wherein the step of processing includes the step of reducing the diameter of the preform precursor by drawing.

8. The process of claim 1, wherein the step of hot pressing is formed in a reactive environment that reacts and removes oxygen and hydrogen containing species from the preform precursor.

9. The process of claim 1, wherein the reactive environment in the steps of fabricating is a reactant selected from the group consisting of $Cl_2$, $CCl_4$, $SF_6$, $BF_3$, $CF_4$, and the decomposition products of a liquefied solid fluorocarbon.

10. A process for producing an optical fiber preform, comprising the steps of:

placing a casing of a first fluoride glass over a core of a second fluoride glass to form a preform precursor, the first fluoride glass having a refractive index less than that of the second fluoride glass; and compressing the casing to collapse it onto the core, the step of compressing being conducted in a reactive environment containing reactants selected from the group consisting of $Cl_2$, $CCl_4$, $SF_6$, $BF_3$, $CF_4$, and the decomposition products of a liquefied solid fluorocarbon, wherein the casing and the core are prepared in a reactive environment containing reactants selected from the group consisting of $Cl_2$, $CCl_4$, $SF_6$, $BF_6$, $BF_3$, $CF_4$, and the decomposition products of a liquefied solid flurocarbon, and wherein the step of compressing includes the step of applying a hydrostatic pressure to the exterior surface of the casing.

11. The process of claim 10, wherein the outer cylindrical diameter of the core is from about 5 to about 90 percent of the outer diameter of the casing, after the step of compressing is completed.

12. The process of claim 10, wherein the step of compressing includes the step of:

elongating the casing by glass drawing.

13. A process for producing an optical fiber, comprising the steps of:

fabricating a hollow cylinder of a first fluoride glass in a reactive environment that reacts and removes oxygen and hydrogen containing species from the glass, the hollow cylinder having an inner bore;

fabricating an inner cylinder of a second fluoride glass in a reactive environment that reacts and removes oxygen and hydrogen containing species from the glass, the second fluoride glass having a refractive index greater than that of the first fluoride glass and having a cylindrical diameter less than that of the inner bore of the hollow cylinder;

inserting the inner cylinder into the inner bore of the hollow cylinder, the inner cylinder and hollow cylinder together being a preform precursor;

processing the preform precursor to bond together the inner cylinder and the hollow cylinder, wherein the step of processing is performed by hydrostatic pressing of the preform precursor; and drawing the processed preform precursor into a glass fiber.

14. The process of claim 13, wherein the reactive environment in the steps of fabricating is a reactant selected from the group consisting of $Cl_2$, $CCl_4$, $SF_6$, $BF_3$, $CF_4$, and the decomposition products of a liquefied solid fluorocarbon.

15. The process of claim 13, wherein the step of processing is performed by drawing the preform precursor into a preform by reducing the cylindrical diameter of the hollow cylinder, and the step of drawing reduces the cylindrical diameter of the preform to that of a fiber.

* * * * *